Oct. 18, 1932.  J. SENFT  1,882,999
ANTISKID CHAIN
Filed May 14, 1931
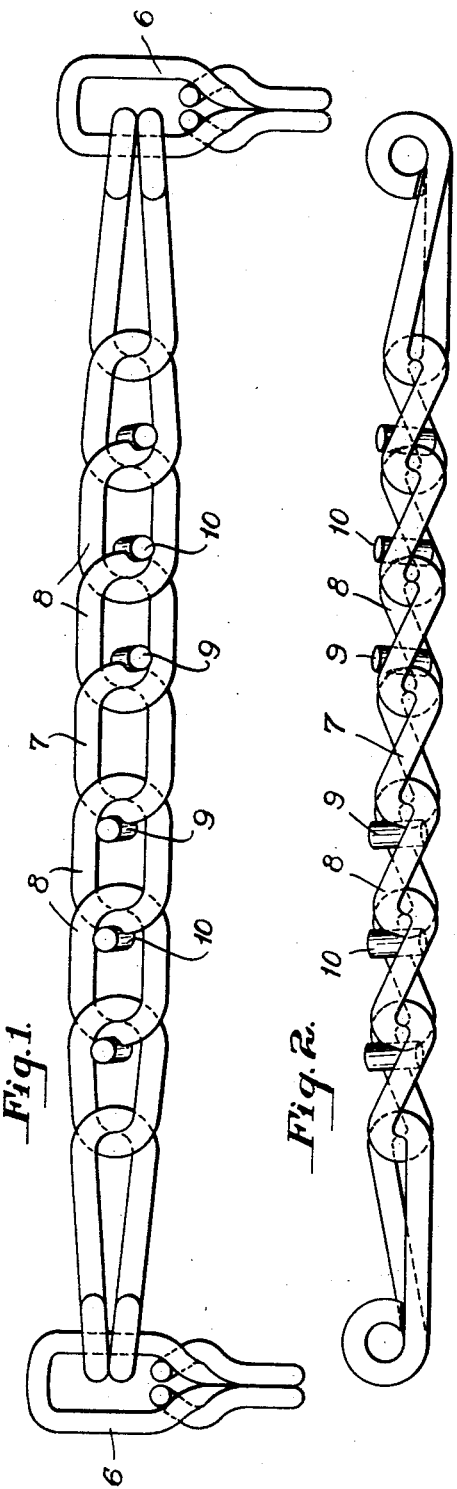
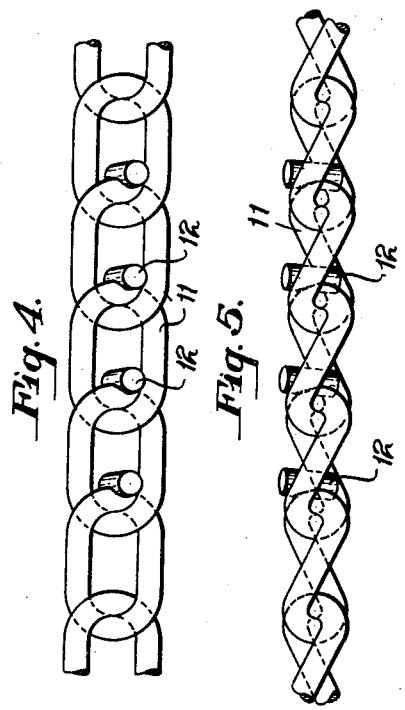
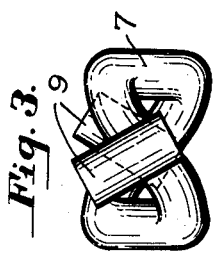
INVENTOR
John Senft,
By Archworth Martin,
Attorney.

Patented Oct. 18, 1932

1,882,999

UNITED STATES PATENT OFFICE

JOHN SENFT, OF YORK, PENNSYLVANIA, ASSIGNOR, BY MESNE ASSIGNMENTS, TO THE McKAY COMPANY, OF PITTSBURGH, PENNSYLVANIA, A CORPORATION OF PENNSYLVANIA

ANTISKID CHAIN

Application filed May 14, 1931. Serial No. 537,271.

My invention relates to anti-skid devices and particularly to tire chains for use on automobiles and the like.

My invention has for its object the provision of a tire chain or the like embodying means for more effectively resisting skidding than various types of chains heretofore employed, and which will also afford increased traction.

Some of the forms which my invention may take are shown in the accompanying drawing, wherein Figure 1 is a plan or face view of a chain structure; Fig. 2 is a side elevational view thereof; Fig. 3 is an end view of one of the links of Fig. 1, on an enlarged scale; Fig. 4 is a plan view showing another form of chain, and Fig. 5 is a side view thereof.

Referring first to Figs. 1, 2 and 3, the numeral 6 indicates fragmentary portions of side chains which may be of any well-known type, and which are utilized for maintaining the cross chains or tread links in place across the tread of a vehicle tire.

The cross chains may be composed of links of the usual type which are preferably twisted in a well-known manner so that they may all lie in substantially a common plane instead of certain of the links being disposed in planes at right angles to the planes of the adjacent links. The intermediate link 7 is shown as having a bar-like stud 9, electrically welded or otherwise secured to each end thereof, while the links 8 at either side thereof have studs 10 secured to their outer ends.

The calks 9 and 10 come into contact with the ground during rotation of the wheel, and therefore provide increased traction, and at the same time, do not greatly increase the weight of the links nor the overall thickness of the chain structure, which features are desirable in a chain of this character.

The calks also prevent skidding or sideslipping of the wheel to which the chain is applied. The calks 9, being at the middle of the tire tread, will wear down quicker than the calks 10, and particularly those calks 10 which are furthest removed from the intermediate link 7. The calks 9 could be omitted, and the chain still be effective to prevent skidding, since at least some of the calks 10 are located sufficiently far from the center of the tire tread that they ordinarily do not come in contact with the ground, except during side sway, and consequent tendency to skidding, whereupon they will be brought into contact with the ground and prevent skidding. Even though the calks 9 and 10 become worn somewhat, their outer ends will still be flush with the wearing faces of the links, and their corners will tend to bite into the roadway, and thereby increase the tractive and anti-slipping qualities of the chain links.

Referring now to Figs. 4 and 5, I show a structure similar to that of Fig. 1, but wherein the calks are all arranged on corresponding ends of each link, instead of located only on the outermost ends of the links, in each direction from the middle link of a cross chain. This arrangement facilitates the manufacture of the chain, since a workman is not likely, as a result of confusion or carelessness, to place the studs on the wrong ends of the links, and perhaps thereby produce an unsymmetrical structure.

The calks of the links may be of such size that they will readily pass through the openings in the links to thus permit turning of a link about an axis perpendicular to the plane of the link. Thus, if the calk on a link near the middle of the cross chain has been worn down considerably, an interconnected link having a calk at its outer end may be so turned as to bring its less worn calk closer toward the center of the tire tread.

I claim as my invention:—

1. An anti-skid chain containing interconnected links each twisted at its ends to permit the said links to lie in approximately a common plane, and calks secured to the extremities of the links and extending outwardly from the median planes thereof, a distance sufficient that they cooperate with the protuberant bends of the links to form traction surfaces.

2. An anti-skid chain containing interconnected links each twisted at its ends to permit the said links to lie in approximately a common plane, and bar-like calks welded at their mid portions to the extremities of the links and extending outwardly from the median planes thereof, a distance sufficient that they cooperate with the protuberant bends of the links to form traction surfaces.

3. An anti-skid chain containing interconnected links each twisted at its ends to permit the said links to lie in approximately a common plane, the calks secured to the extremities of the links and extending outwardly from the median planes thereof, a distance sufficient that they cooperate with the protuberant bends of the links to form traction surfaces, the calks being diagonally disposed with respect to the plane of the links.

In testimony whereof I, the said JOHN SENFT, have hereunto set my hand.

JOHN SENFT.